(12) United States Patent
Hymel

(10) Patent No.: US 7,961,144 B2
(45) Date of Patent: Jun. 14, 2011

(54) SYSTEM AND METHOD FOR CORRELATING BROADCAST STATION WITH GEOGRAPHIC PROXIMITY ON EARTH

(75) Inventor: James Allen Hymel, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 254 days.

(21) Appl. No.: 12/354,238

(22) Filed: Jan. 15, 2009

(65) Prior Publication Data
US 2010/0164792 A1    Jul. 1, 2010

Related U.S. Application Data

(60) Provisional application No. 61/141,790, filed on Dec. 31, 2008.

(51) Int. Cl.
*G01S 19/48* (2010.01)
(52) U.S. Cl. .................................. 342/357.31
(58) Field of Classification Search ............. 342/357.25, 342/357.31, 357.46, 357.67, 367; 701/213, 701/215
See application file for complete search history.

(56) References Cited

U.S. PATENT DOCUMENTS

2010/0080163 A1* 4/2010 Krishnamoorthi et al. ... 370/312
2010/0141520 A1* 6/2010 Ghinamo et al. ........ 342/357.12

* cited by examiner

*Primary Examiner* — Dao L Phan
(74) *Attorney, Agent, or Firm* — Ronald O. Neerings; Wade James Brady, III; Frederick J. Telecky, Jr.

(57) ABSTRACT

A communication device for use in a system including a first global positioning system satellite, a second global positioning satellite, a broadcast transmitter and a database. The communication device includes a first receiver, a processing portion, a transmission portion, a second receiver portion and a communication portion. The first receiver portion is operable to receive the broadcast signal. The processing portion is operable to extract the broadcast transmitter identification information from the broadcast signal. The transmission portion is operable to transmit the broadcast transmitter identification information to the database. The second receiver portion is operable to receive the correlation signal. The communication portion is operable to transmit a communication signal to the one of the first global positioning system satellite and the second global positioning satellite, based on the correlation signal.

20 Claims, 7 Drawing Sheets

SYSTEM AND METHOD FOR CORRELATING BROADCAST STATION WITH GEOGRAPHIC PROXIMITY ON EARTH

The present application claims benefit under 35 U.S.C, §119 (e) to U.S. provisional patent application No. 61/141, 790, filed Dec. 31, 2008, the entire disclosure of which is incorporated herein by reference.

BACKGROUND

A mobile phone (also known as a wireless phone, cell phone, or cellular phone) is a communication device used for mobile voice or data communication over a cellular network of specialized base stations known as cell tower stations or cell towers. In addition to the standard voice function of a mobile phone, current mobile phones may support many additional services. One of these popular services is global positioning system (GPS) assistance.

A conventional method of obtaining accurate GPS assistance includes using a mobile phone to identify its current cell and to pass that data to a network server. The network server accesses a database that correlates a carrier cell's identification information to a geographic location. By then referencing a real-time GPS satellite database, a computer program may immediately discern which satellites are most visible to that mobile phone's cell. The orbits for these satellites, which are complied into a file called an ephemeris, are located and transmitted to the mobile phone. The mobile phone can then easily lock to the satellite network, as described in more detail below.

FIG. 1 illustrates a conventional satellite communication system used for a satellite GPS application. In the figure, satellite 104, satellite 106 and satellite 108 are in orbits around Earth 102 in orbit 110, orbit 112 and orbit 114, respectively. The distance from any specific location on Earth 102 to each of satellite 104, satellite 106 and satellite 108 varies with time.

FIG. 2 illustrates a satellite PGS application used in a conventional communication system. In the figure, a user 202, is operating a mobile phone 204, within range of a cell tower 206. Further, satellites 104 and 106 are orbiting above Earth 102. Mobile phone 204 is operable to communicate with cell tower 206, as indicated by dashed communication line 208, and to communicate with satellite 104, as indicated by dotted communication line 210.

A cellular network connects cell phones to one another via cell towers and satellites. Each cell tower communicates with one or more satellites, for example, cell tower 206 communicates with satellites 104 and 106 as indicated by dotted communication lines 212 and 214, respectively. The satellites additionally are able to communicate with one another, for example, satellite 104 and 106 communicate with each other as indicated by dotted communication line 216. Orbiting around Earth, each satellite is able to communicate to the cellular network by communicating with a plurality of cell towers.

FIG. 3 geographically illustrates a conventional cellular network. In the figure, region 302 is populated by multiple cells, a portion of which are illustrated as cells 304 through 348 (evenly numbered). Each cell is served by a fixed transmitter from one or more cell towers. A mobile phone user, within a cell, communicates via a cell tower geographically located within that cell For example, with additional reference to FIG. 2, if user 202 were located at point 350, which is within cell 328, then user 202 would communicate with others via cell tower 206 within cell 328.

Referring back to FIG. 2, when user 202 wants to obtain GPS assistance, via mobile phone 204, mobile phone 204 needs to communicate with a satellite within a GPS network. However, as discussed above, a plurality of satellites 104, 106 and 108 are constantly orbiting about Earth. As such, it may be difficult for mobile phone 204 to locate and lock onto a particular satellite.

A conventional method of addressing the problem of locating and locking onto a particular satellite, includes using the cellular network. Specifically, mobile phone 204 is used to communicate with cell tower 206. Cell tower 206 recognizes its current cell identification information, for example the identification information of cell 328 in FIG. 3. Conventional databases list geographical location of cell towers, which includes cell tower 206. Further, some conventional GPS service providers correlate the geographical location of cell towers to the plurality of GPS satellites through an ephemeris database.

Cell tower 206 is able to contact any one of many cell phone service providers having information that corresponds to the geographical location of cell tower 206. The cell phone service provider may then references GPS service provider to obtain a real-time GPS satellite ephemeris that determines the closest orbiting satellite to cell tower 206. As mobile phone 204 is within the transmission area of cell tower 206, then the closest orbiting satellite to cell tower 206 is likely the closest orbiting satellite to mobile phone 204.

Once the closest orbiting satellite to mobile phone 204 is identified, the GPS service provider provides communication data to the cell phone service provider, which then provides the communication data to mobile phone 204 via cell tower 206 to enable mobile phone 204 to locate and lock onto the satellite. In the example illustrated in FIG. 2, satellite 104 is closer than satellite 106 to cell tower 206. This enables mobile phone 204 to communicate with satellite 104 as indicated by dotted communication line 210.

The conventional approach of accessing a GPS service discussed above is not easy to implement because the region covered by each cell tower is limited. In addition, cell phone providers are required to pay royalties to utilize this technique.

What is needed is a system and method to lock to a GPS satellite without using the location data of a cell tower within a cellular communication system.

BRIEF SUMMARY

It is an object of the present invention to provide a system and method to lock to a GPS satellite without using the cellular communication system.

In accordance with an aspect of the present invention, a mobile phone may be used in a system including a first global positioning system satellite, a second global positioning satellite, a broadcast transmitter and a database. The first global positioning system satellite is operable to generate a first position signal. The second global positioning system satellite is operable to generate a second position signal. The broadcast transmitter is disposed in a first location and is operable to transmit a broadcast signal having broadcast transmitter identification information therein. The database has correlation data therein. The data base is operable to generate a first correlation, to generate a second correlation and to generate a correlation signal. The first correlation is based the broadcast transmitter identification information and the first location. The second correlation is based on the first location and one of the first global positioning system satellite and the second global positioning satellite. The correlation signal is based on the second correlation. The mobile phone includes a first receiver, a processing portion, a transmission portion, a second receiver portion and a communication portion. The first receiver portion is operable to receive the broadcast signal. The processing portion is operable to extract the broadcast transmitter identification information from the broadcast signal. The transmission portion is operable to transmit the broadcast transmitter identification information to the database. The second receiver portion is operable to receive the correlation signal. The communication portion is operable to transmit a communication signal to the one of the first global positioning system satellite and the second global positioning satellite, based on the correlation signal.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

In accordance with an aspect of present invention, a system is provided to enable a mobile phone to locate and lock onto a GPS satellite using a broadcast from a broadcast station.

An example embodiment in accordance with an aspect of present invention will now be described with reference to FIG. 4 through FIG. 7.

Figure 4:
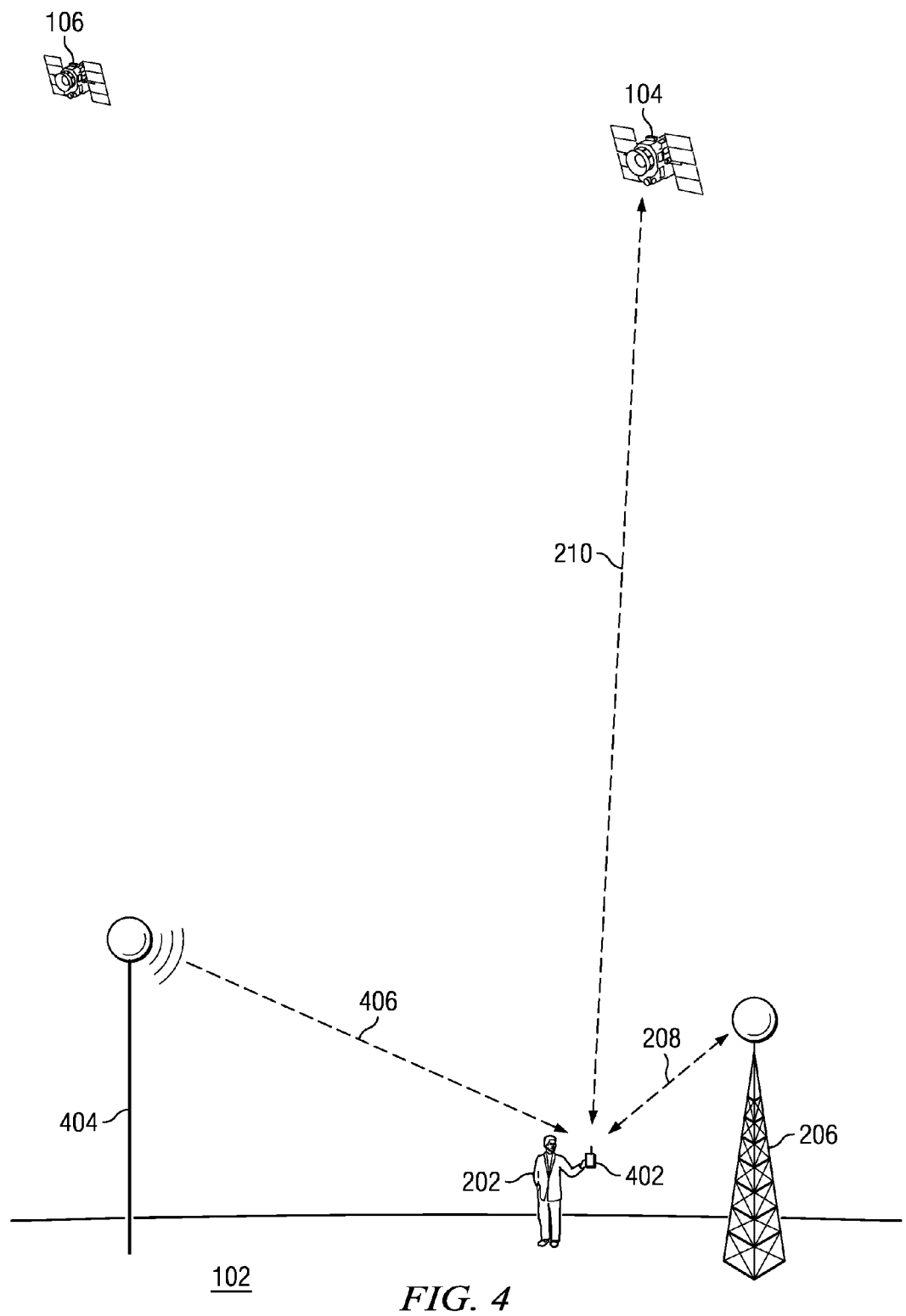
FIG. 4 illustrates a communication system using the FM Radio Data Service (RDS) station ID correlations in present invention.

FIG. 4 illustrates an example communication system that enables a mobile phone to locate and lock onto a GPS satellite using a broadcast from a broadcast station in accordance with an aspect of the present invention.

In the figure, a user 202, is operating a mobile phone 402, within range of a cell tower 206 and a broadcast station 404. Further, satellites 104 and 106 are orbiting above Earth 102. Mobile phone 402 is operable to communicate with cell tower 206, as indicated by dashed communication line 208, to receive a broadcast from broadcast station 404, as indicated by dashed communication line 406, and to communicate with satellite 104 as indicated by dotted communication line 210. Broadcast station 404 is able to broadcast information that includes geographical information and station identification information.

Figure 1:
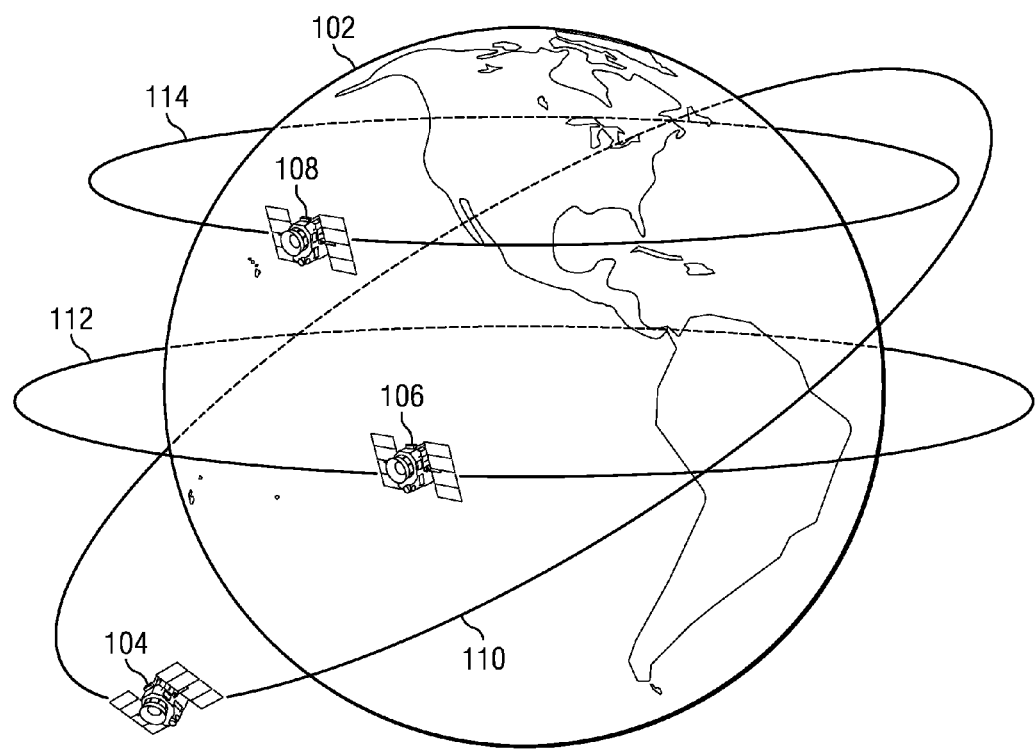
FIG. 1 illustrates a communication system used for satellite GPS application.
Figure 2:
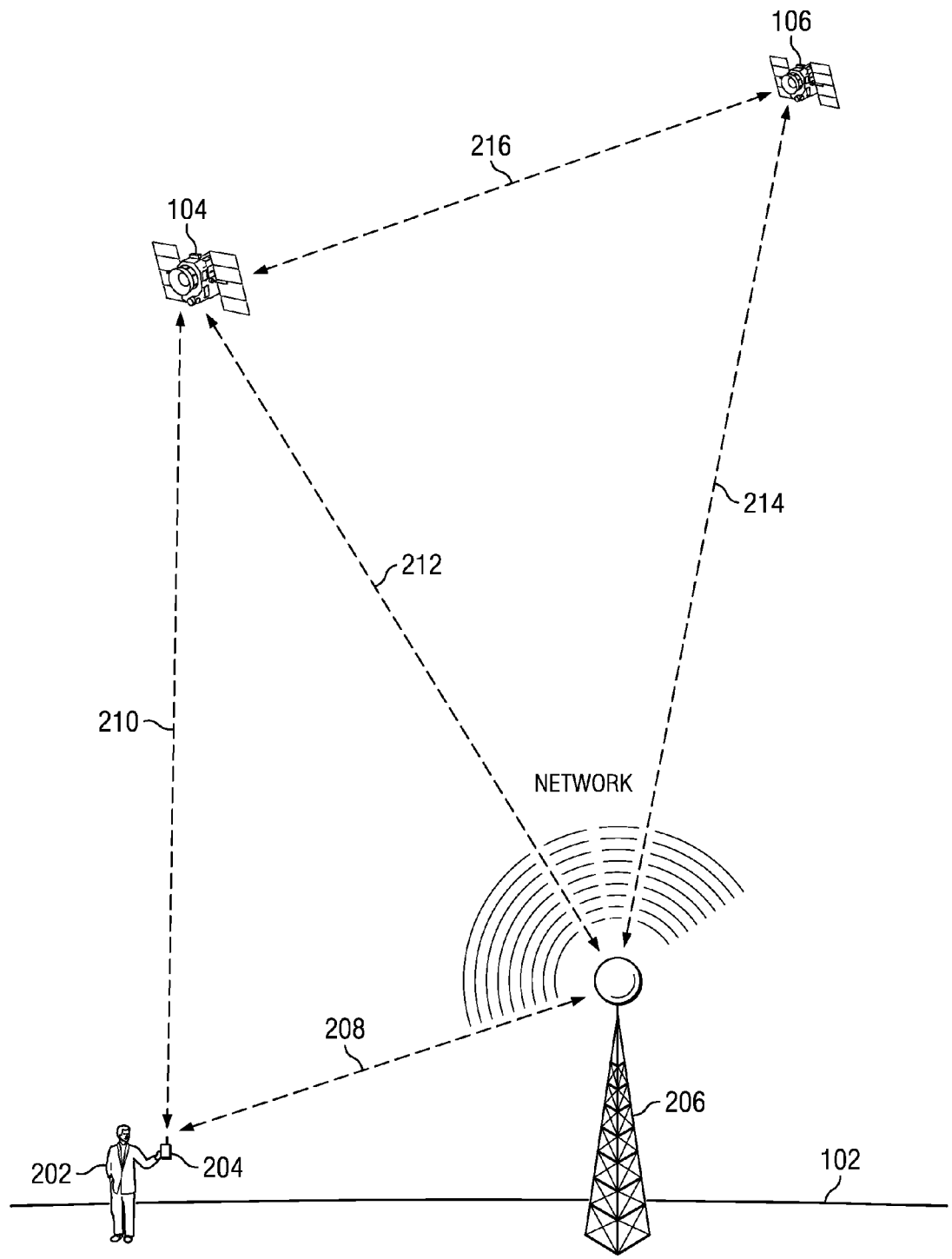
FIG. 2 illustrates a conventional communication system associates with satellite a GPS application.

In accordance with an example aspect of present invention, mobile phone 402 communicates with broadcast station 404 for GPS assistance, as opposed to communicating with cell tower 206 as discussed above with respect to FIG. 2. Broadcast station 404 broadcasts information that includes, inter alia, station identification. Mobile phone 402 receives the broadcast information from broadcast station 404 and extracts the station identification information.

The station identification information is used to associate a geographical location of broadcast station 404. Because mobile phone 402 is close enough to broadcast station 404 to receive the broadcast information, then mobile phone 402 may be considered close to the geographical location of broadcast station 404.

Mobile phone 402 is used to communicate with cell tower 206. Mobile phone 402 communicates, via cell tower 206, with a station location service provider that correlates the station identification information of broadcast station 404 to a geographic location. The station location service provider then communicates the geographic location to a GPS service provider, which then references a real-time GPS satellite ephemeris that determines the closest orbiting satellite to broadcast station 404. As mobile phone 402 is within the transmission area of broadcast station 404, then the closest orbiting satellite to broadcast station 404 is likely the closest orbiting satellite to mobile phone 402.

Once the closest orbiting satellite to mobile phone 402 is identified, the GPS service provider provides communication data to the cell phone service provider, which then provides the communication data to mobile phone 402 via cell tower 206 to enable mobile phone 402 to locate and lock onto the satellite. In the example illustrated in FIG. 4, satellite 104 is closer than satellite 106 to broadcast station 404. This enables mobile phone 402 to communicate with satellite 104 as indicated by dotted communication line 210.

An example process in accordance with an embodiment of present invention will now be described with reference to FIG. 5.

Figure 5:
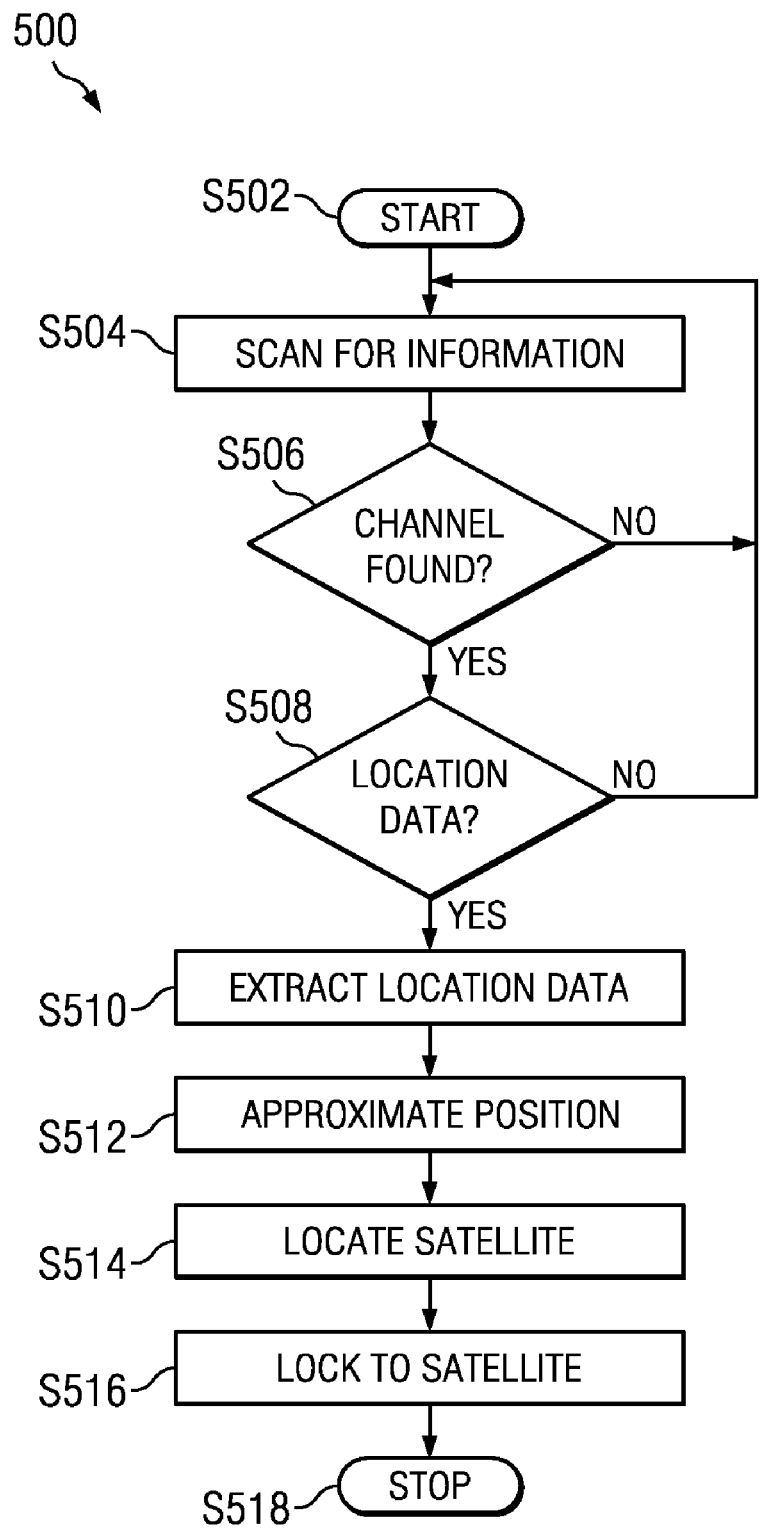
FIG. 5 illustrates a flowchart of an example process of operating system in accordance with present invention.

FIG. 5 is a flowchart of an example process 500 of operating a system in accordance with an aspect of the present invention. Process 500 starts (S502) and mobile phone 402 scans for broadcast information (S504). Scanning may be performed by any known method. Further, non-limiting examples of broadcast information to be scanned include radio broadcast signals and TV broadcast signals.

In an example embodiment, mobile phone 402 scans for available FM RDS stations. RDS is a communications protocol standard that originated in the European Broadcasting Union for sending small amounts of digital information using conventional FM radio broadcasts. The RDS system standardizes several types of information transmitted, including time, track/artist info and station identification.

If the amplitude of received broadcast information is above a predetermined threshold, the broadcast station that is broadcasting the information will be selected as a target station. Once such a target station is detected (S506), mobile phone 402 will scan the broadcast information for the station's identification data (S508).

If mobile phone 402 is unable to detect the station's identification data within the broadcast information, then mobile phone 402 scans for new broadcast information (S504).

If mobile phone 402 is able to detect the station's identification data within the broadcast information, then mobile phone 402 extracts the station's identification data (S510).

In this embodiment, mobile phone 402 provides, via cell tower 206, the station's identification data to the station location service provider. The station location service provider then determines the geographic location of broadcast station 404 based on the station's identification data. Because mobile phone 402 is close enough to broadcast station 404 to receive the broadcast information, then mobile phone 402 may be considered close to the geographical location of broadcast station 404 (S512).

Once the station location service provider determines the geographical location of broadcast station 404, and hence the approximate geographical location of mobile phone 402, the station location service provider communicates the geographical location of broadcast station 404 to a GPS service provider. The GPS service provider then searches the ephemeris for the closest satellite (S514).

After determining the closest satellite, the GPS service provider then sends the necessary information about the selected satellite to the cell phone service provider, which then sends the information to mobile phone 402 via cell tower 206. When mobile phone 402 receives the selected satellite's contact information, mobile phone 402 uses the information to lock onto the selected satellite (S518). In the example embodiment as illustrated in FIG. 4, mobile phone 402 is able to communicate with satellite 104 as indicated by dotted communication line 210.

Figure 6:
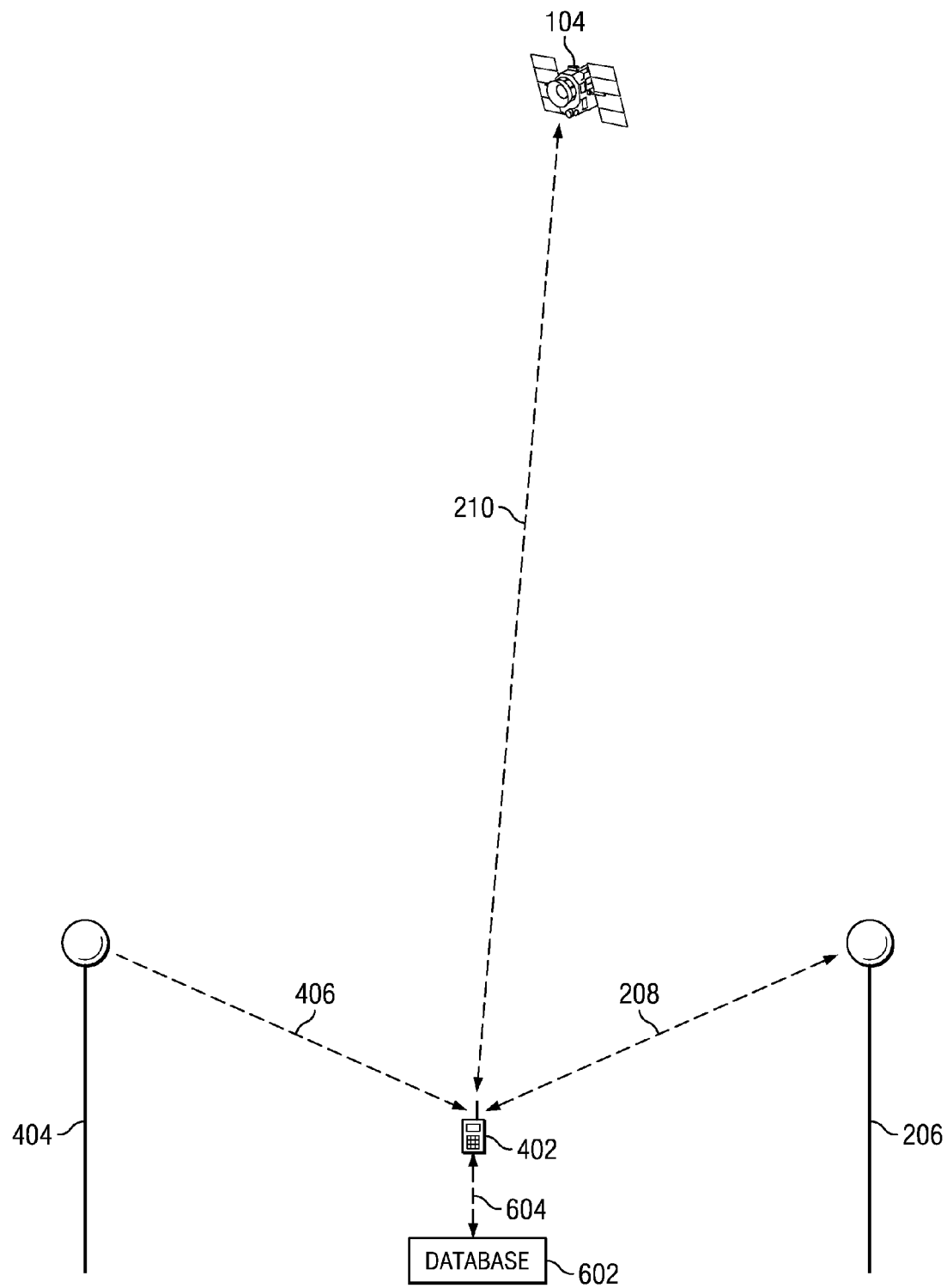
FIG. 6 illustrates how a mobile phone operates in a fully functioned communication network with a GPS application.

FIG. 6 illustrates how a mobile phone operates in a fully functioned communication network with a GPS application in accordance with an aspect of the present invention. In the figure, mobile phone 402 is operable to communicate with: cell tower 206 via dashed communication line 208; satellite 104 via dotted communication line 210; broadcast station 404 via dashed communication line 406; and database 602 via dotted communication line 604. Database 602 may include databases provided by any combination of a GPS service provider, a cell phone service provider and a station location service provider.

Figure 7:
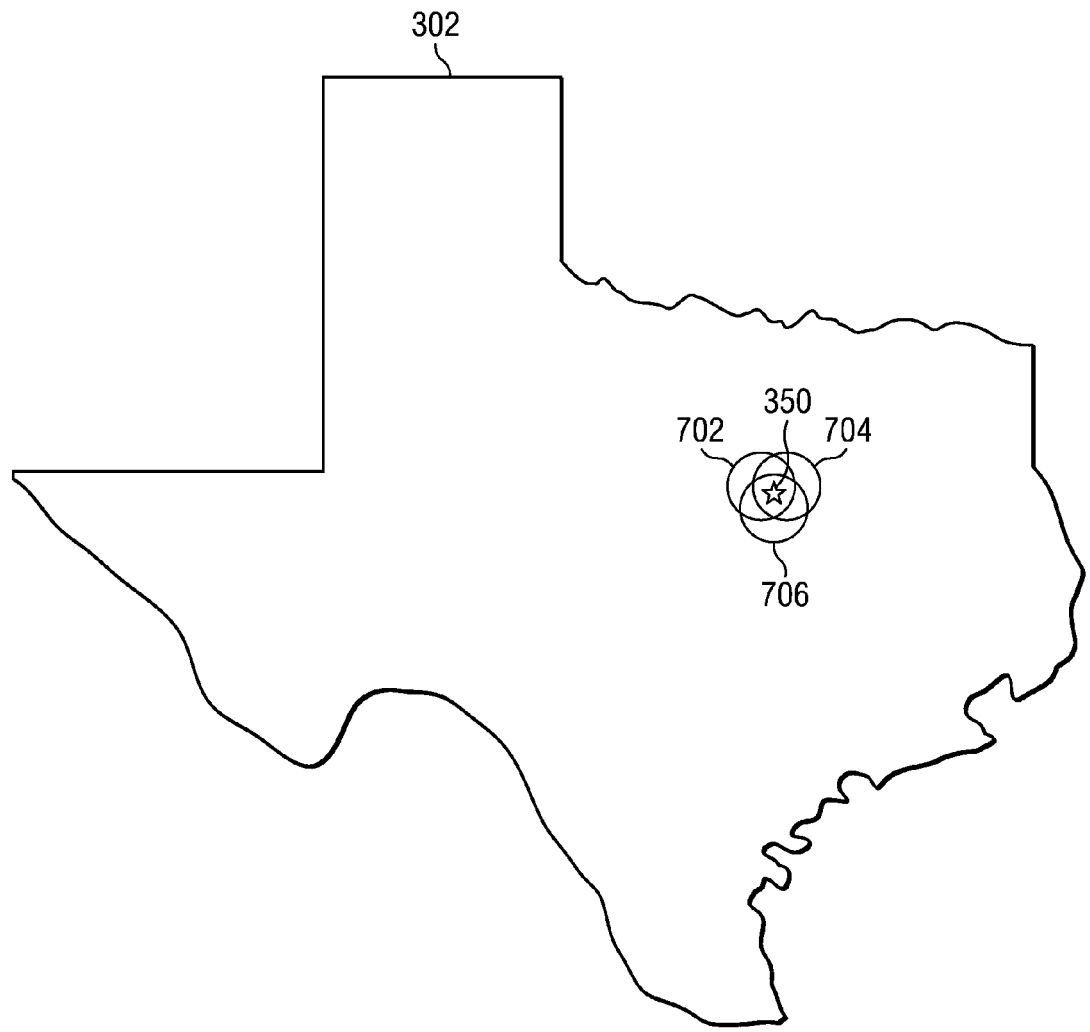
FIG. 7 geometrically illustrates the operation of mobile phone associates with a broadcast antenna in present invention.

FIG. 7 geographically illustrates the operation of communication system in accordance with an aspect of the present invention. In the figure, region 302 is populated by a plurality of broadcast stations, each having a corresponding broadcast area. Example broadcast station areas are illustrated in the figure as area 702, area 704, and area 706. Each area is covered by the signal transmitted from an individual broadcast antenna. A mobile phone user, within a broadcast area, communicates via a cell tower geographically located within that broadcast area.

Referring back to FIG. 4, when user 202 wants to obtain GPS assistance, via mobile phone 402, mobile phone 402 needs to communicate with a satellite within a GPS network. However, as discussed above, a plurality of satellites 104, 106 and 108 are constantly orbiting about Earth. As such, it may be difficult for mobile phone 402 to locate and lock onto a particular satellite.

In accordance with an aspect of the present invention, mobile phone 402 is used to receive a broadcast signal from any one of the broadcast stations corresponding to broadcast areas 702, 704 and 706. If any one of the received signals from the broadcast stations corresponding to broadcast areas 702, 704 and 706 include identification information that may be used to geographically locate that particular broadcast station, mobile phone 402 retrieves the identification information. Mobile phone 402 then communicates, via cell tower 206, with a station location service provider that correlates the identification information of the detected broadcast station 404 to a geographic location. A GPS service provider then references a real-time GPS satellite ephemeris that determines the closest orbiting satellite to broadcast station 404. As mobile phone 402 is within the transmission area of broadcast station 404, then the closest orbiting satellite to broadcast station 404 is likely the closest orbiting satellite to mobile phone 402.

Figure 3:
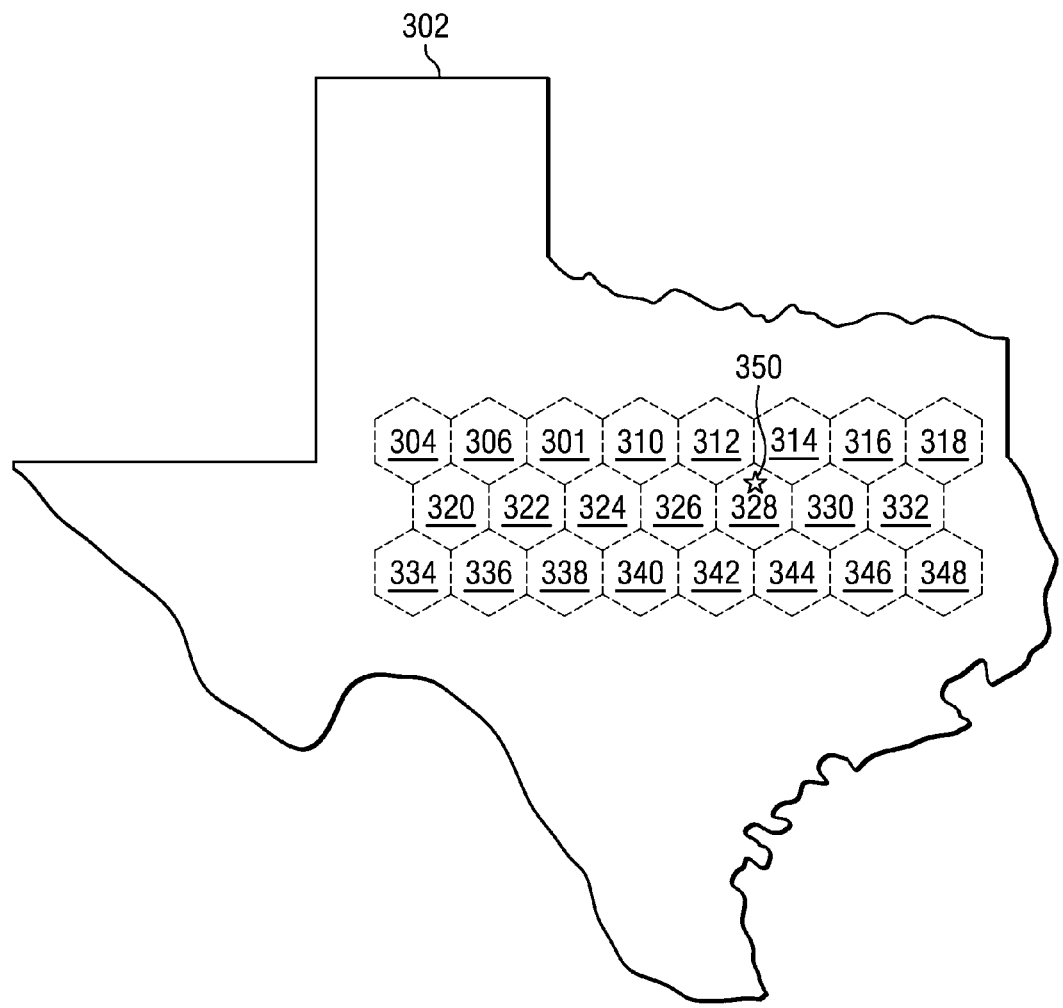
FIG. 3 geometrically illustrates how a cell tower operates with cellular network architecture.

FIG. 7 differs from FIG. 3 with the way geographic proximity of the user is determined. In the conventional approach discussed above with respect to FIG. 3, user 202 at point 350 is determined by recognizing the cell ID of cell 328 that covers the user in point 350. In contrast with an aspect of the present invention, a geographic proximity of user 202 at point 350 in FIG. 7 is determined by identifying the identification information of a broadcast station, for example, any one of the received signals from the broadcast stations corresponding to broadcast areas 702, 704 and 706.

In the above discussed embodiments, the identification information is used by a station identification service to determine the geographic location of the broadcast station. In other embodiments, the identification information includes the geographic location, e.g., latitude and longitude data, of the broadcast station. In such embodiments, there is no need to contact a station identification service. In these embodiments, the cell phone may communicate directly with a GPS service provider to correlate the geographical location with the ephemerides to determine the closest orbiting satellite. In still other embodiments, a cell phone may include a database therein that correlates identification information from broadcast stations with corresponding geographic locations. In these embodiments, the cell phone may additionally communicate directly with a GPS service provider to correlate the geographical location with the ephemerides to determine the closest orbiting satellite The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A communication device for use in a system including a first global positioning system satellite, a second global positioning satellite, a broadcast transmitter and a database, the first global positioning system satellite being operable to generate a first position signal, the second global positioning system satellite being operable to generate a second position signal, the broadcast transmitter being disposed in a first location and being operable to transmit a broadcast signal having broadcast transmitter identification information therein, the database having correlation data therein, the data base being operable to generate a first correlation, to generate a second correlation and to generate a correlation signal, the first correlation being based on the broadcast transmitter identification information and the first location, the second correlation being based on the first location and one of the first global positioning system satellite and the second global positioning satellite, the correlation signal being based on the second correlation said communication device comprising:

a first receiver portion operable to receive the broadcast signal;

a processing portion operable to extract the broadcast transmitter identification information from the broadcast signal;

a transmission portion operable to transmit the broadcast transmitter identification information to the database;
a second receiver portion operable to receive the correlation signal; and
a communication portion operable to transmit a communication signal to the one of the first global positioning system satellite and the second global positioning satellite, based on the correlation signal.

2. The communication device of claim 1, wherein said first receiver portion, said processing portion, said transmission portion, said second receiver portion and said communication portion are a unitary portion.

3. The communication device of claim 2, wherein said transmission portion is operable to transmit the broadcast transmitter identification information to the database.

4. The communication device of claim 1, wherein at least one of said first receiver portion, said processing portion, said transmission portion, said second receiver portion and said communication portion are separate portions.

5. The communication device of claim 4, wherein said transmission portion is operable to transmit the broadcast transmitter identification information to the database.

6. The communication device of claim 1, wherein said first receiver portion is operable to receive a radio signal as the broadcast signal.

7. The communication device of claim 6, wherein said first receiver portion is operable to receive an FM radio signal as the radio signal.

8. The communication device of claim 1, wherein said first receiver portion is operable to receive a television signal as the broadcast signal.

9. A communication device for use in a system including a first global positioning system satellite, a second global positioning satellite and a broadcast transmitter, the first global positioning system satellite being operable to generate a first position signal, the second global positioning system satellite being operable to generate a second position signal, the broadcast transmitter being disposed in a first location and being operable to transmit a broadcast signal having broadcast transmitter identification information therein, said communication device comprising:
a database portion having correlation data therein and being operable to generate a first correlation, to generate a second correlation and to generate a correlation signal, the first correlation being based on the broadcast transmitter identification information and the first location, the second correlation being based on the first location and one of the first global positioning system satellite and the second global positioning satellite, the correlation signal being based on the second correlation,
a first receiver portion operable to receive the broadcast signal;
a processing portion operable to extract the broadcast transmitter identification information from the broadcast signal;
a transmission portion operable to transmit the broadcast transmitter identification information to said database portion;
a second receiver portion operable to receive the correlation signal; and
a communication portion operable to transmit a communication signal to the one of the first global positioning system satellite and the second global positioning satellite, based on the correlation signal.

10. The communication device of claim 9, wherein said database portion, said first receiver portion, said processing portion, said transmission portion, said second receiver portion and said communication portion are a unitary portion.

11. The communication device of claim 10, wherein said transmission portion is operable to provide the broadcast transmitter identification information to said database portion.

12. The communication device of claim 9, wherein at least one of said database portion, said first receiver portion, said processing portion, said transmission portion, said second receiver portion and said communication portion are separate portions.

13. The communication device of claim 12, wherein said transmission portion is operable to provide the broadcast transmitter identification information to said database portion.

14. The communication device of claim 9, wherein said first receiver portion is operable to receive a radio signal as the broadcast signal.

15. The communication device of claim 14, wherein said first receiver portion is operable to receive an FM radio signal as the radio signal.

16. The communication device of claim 9, wherein said first receiver portion is operable to receive a television signal as the broadcast signal.

17. A method of communicating with a system including a first global positioning system satellite, a second global positioning satellite, a broadcast transmitter and a database, the first global positioning system satellite being operable to generate a first position signal, the second global positioning system satellite being operable to generate a second position signal, the broadcast transmitter being disposed in a first location and being operable to transmit a broadcast signal having broadcast transmitter identification information therein, the database having correlation data therein, the data base being operable to generate a first correlation, to generate a second correlation and to generate a correlation signal, the first correlation being based on the broadcast transmitter identification information and the first location, the second correlation being based on the first location and one of the first global positioning system satellite and the second global positioning satellite, the correlation signal being based on the second correlation, said method comprising:
receiving, via a first receiver portion, the broadcast signal;
extracting, via a processing portion, the broadcast transmitter identification information from the broadcast signal;
transmitting, via a transmission portion, the broadcast transmitter identification information to the database;
receiving, via a second receiver portion, the correlation signal; and
transmitting, via a communication portion, a communication signal to the one of the first global positioning system satellite and the second global positioning satellite, based on the correlation signal.

18. The method of claim 17, wherein said receiving, via a first receiver portion, the broadcast signal comprises receiving a radio signal as the broadcast signal.

19. The method of claim 18, wherein said receiving radio signal as the broadcast signal comprises receiving an FM radio signal as the radio signal.

20. The method of claim 17, wherein said receiving, via a first receiver portion, the broadcast signal comprises receiving a television signal as the broadcast signal.

* * * * *